Figure 1:
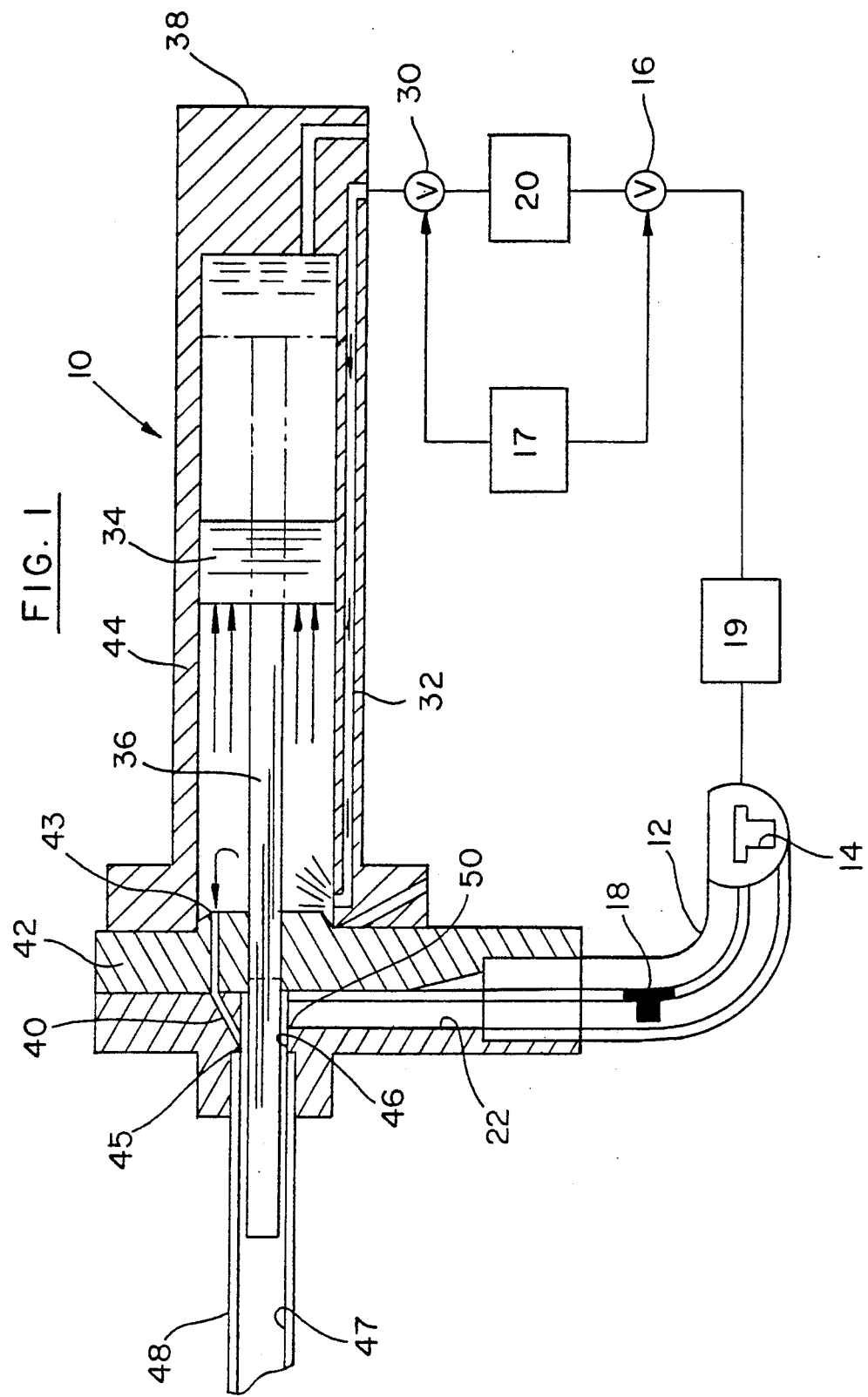

United States Patent [19]

Meyer, Sr.

[11] Patent Number: 5,068,511

[45] Date of Patent: Nov. 26, 1991

[54] STUD WELDING TOOL

[75] Inventor: Kenneth R. Meyer, Sr., Lake Orion, Mich.

[73] Assignee: Emhart Industries, Inc., Towson, Md.

[21] Appl. No.: 553,095

[22] Filed: Jul. 13, 1990

[51] Int. Cl.⁵ ............................................. B23K 9/20
[52] U.S. Cl. .................................................... 219/98
[58] Field of Search ................................... 219/98, 99

[56] References Cited

U.S. PATENT DOCUMENTS 3,526,744  9/1970  Ehrlich ................................. 219/98

Primary Examiner—Clifford C. Shaw
Attorney, Agent, or Firm—Spencer T. Smith

[57] ABSTRACT

The next stud is blown under pressure into the receiver after a stud has been welded and as the rod which locates the stud for welding is withdrawn to its fully retracted position the next stud is first subjected to a vacuum which draws the next stud into the collet and then blown fully into the collet.

4 Claims, 1 Drawing Sheet

STUD WELDING TOOL

The present invention relates to automatic feed stud welding tools.

Following the weld in an automatic feed stud welding tool, an individual T-stud is propelled by compressed air through a feed tube, which has a matching T shaped cross-section, into a T-shaped passageway in the receiver where it comes to rest against the extended piston rod of the stud welding tool. The piston rod is retracted and the T-stud is propelled through a right angled transition into the collet. Successful transfer from the T-slot to the collet requires that the alignment of the T-stud shank (parallel to the collet axis) be maintained throughout this transition.

To increase the likelihood of successful transition (to keep the T-stud from rotating end over end due to turbulence caused by the compressed air flowing past the T-stud), the T-shaped passageway in the receiver is designed with minimal clearances for maximum mechanical control. This however may result in jams in the receiver due to debris or minor surface imperfections on the T-stud.

It is accordingly an object of the present invention to provide an automatic stud welding tool which will eliminate the problem of T-stud jamming at the location where the T-shaped passageway meets the right angled transition.

Other objects and advantages of the present invention will become apparent from the following portion of the specification and from the accompanying drawings, which illustrate, in accordance with the mandate of the patent statutes, a presently preferred embodiment of the invention.

Referring to the drawing:

The sole figure is a cross sectional view of the ram of a stud welding tool made in accordance with the teachings of the present invention with the piston rod being retracted from its weld location.

The ram 10 includes a feed tube 12 having a T-shaped passageway 14. When a suitable valve 16 is turned on by a controller 17 a single T-shaped stud 18 supplied from a suitable feeder 19, will be blown by air under pressure from a suitable source 20 through this feed tube into the feed channel 22 (also T-shaped in cross section) of the tool receiver 24. Following the welding operation controller 17 opens retract valve 30 which connects the pressure source 20 to the piston retract line 32. The integral piston 34 and rod 36 of a pneumatic cylinder 38 will accordingly be forcefully displaced to the fully retracted position (shown in phantom). The system controller 17 turns off the feed valve 16 when it opens the retract valve 30 so that as the piston is being retracted air pressure used to propel the T-stud 18 through the feed tube 12 to the receiver 22 will be terminated and the T-shaped stud which had been blown against the rod will accordingly fall by gravity until it is stopped by a bend in the feed tube 12, or vacuum force.

An orifice 40 is defined in the receiver housing 42 communicating at one end 43 with the piston retract air within the load tube 44 and communicating at the other end 45 with a receiver bore 46 (which is continuous with the bore 47 in the collet 48) downstream from the receiver passageway 22 so that air under pressure will be diverted through the orifice during rod displacement. The orifice 40 discharges pressurized air forwardly (at a thirty degree angle) into the collet downstream of the critical point of transition 50 causing a vacuum upstream of the orifice opening 45. As a result, when the rod 36 is retracted to the fully retracted position the generated vacuum will pull the T-shaped stud back into the receiver. As the T-shaped stud enters the transition area atmospheric air will rush past the stud shank thereby maintaining its desired alignment and thereby assuring that it will clear the critical transition point. As soon as the stud advances past the orifice opening the jetted air will blow the stud to the end of the collet.

Claims:

1. A stud welding tool comprising
    a stud receiver having a horizontal through passageway and a vertical passageway extending vertically upwardly from the bottom of said stud receiver and communicating with said horizontal passageway,
    a collet secured within one end of said horizontal passageway,
    a load tube secured to said receiver to define a cylinder therewith,
    an actuator including a piston and a rod displaceable within said cylinder with said rod displaceable from a retracted position at one side of said vertical passageway to an advanced position locating a stud in the end of said collet,
    feed tube means for guiding a stud to said vertical passageway,
    means for blowing a stud through said feed tube means and said vertical passageway toward said rod when said rod is at said advanced position,
    means for terminating said blowing means when said piston is retracted and
    exteriorly directed air jet means located downstream of the juncture of said vertical and horizontal passageways for creating a vacuum upstream thereof for drawing a stud located in said vertical passageway or in said feed tube means downstream toward said collet,
    said air jet means further comprising means for blowing the stud to the end of said collet when said stud is displaced downstream of said air jet means.

2. A stud welding tool according to claim 1, wherein the stud is T-shaped and said vertical passageway and said feed tube means are T-shaped in cross-section.

3. A stud welding tool according to claim 2, wherein said air jet means jets air into said collet at an angle of approximately 30° to the horizontal.

4. A stud welding tool according to claim 3, wherein said air jet means comprises an orifice communicating with the piston retract air within said load tube.

* * * * *